Feb. 18, 1969 E. M. DEXTER ETAL 3,428,067
PURE FLUID SYSTEM
Filed Nov. 19, 1965
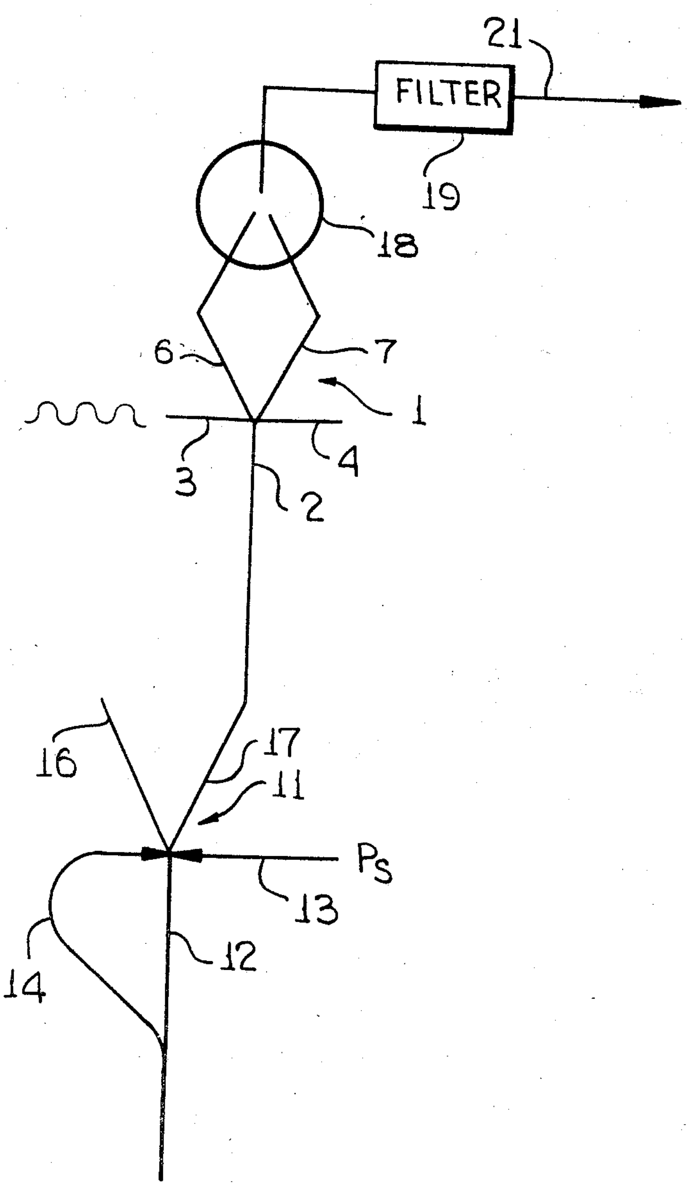
INVENTORS
EDWIN M. DEXTER
& RONALD C. HUMPHREY
BY Hurvitz & Rose
ATTORNEYS 3,428,067

PURE FLUID SYSTEM

Edwin M. Dexter, Silver Spring, Md., and Ronald L. Humphrey, Wyckoff, N.J., assignors to Bowles Engineering Corporation, Silver Spring, Md., a corporation of Maryland Filed Nov. 19, 1965, Ser. No. 508,719
U.S. Cl. 137—81.5
Int. Cl. F15c 1/08, 1/14
10 Claims

ABSTRACT OF THE DISCLOSURE

A pure fluid analog amplifier has a cyclically varying pressure signal applied to its control nozzle and a variable fluid pressure signal applied to its power nozzle whereby the cyclically varying pressure signal is amplitude modulated by the variable pressure signal and the output signal of the amplifier represents a multiplication of the two signals. Alternatively, the variable pressure signal applied to the power nozzle may represent an inverse function of a further signal, as generated by a pure fluid amplifier inverter, whereby the output signal of the first mentioned amplifier represents a division function of the cyclically varying pressure signal and the further signal.

The present invention relates to pure fluid systems, and, more particularly, to a pure fluid modulator and/or multiplier.

In conventional pure fluid analog, i.e. proportional, amplifiers it is a known fact that the differential in pressure variations and therefore the differential gain of the apparatus is a function of design parameters only. The primary design parameters to be considered are: relative areas of the control and power nozzles and the distance from the power nozzle to the output passages. The theory upon which these statements are based may be found at pages 41–43 of the ASME publication of papers presented at the Symposium of Fluid Jet Control Devices at the Winter Annual Meeting of the ASME at New York, Nov. 28, 1962.

Since the differential in output pressures in a pure fluid amplifier is substantially independent of supply pressure, output signals are a function of the product of dfferential gain of the amplifier and the control signal.

In conventional use of fluid amplifiers as pressure amplifiers, analog control signals (signals which vary randomly relative to an ambient pressure) are applied to the control nozzles, and since the gain of the amplifier is a constant, the output signal is equal to this constant times the control signal of the device.

In accordance with the present invention, it has been found that, if a cyclically varying pressure is applied to a control nozzle, the operation of an analog amplifier is not as described above and the gain of the apparatus becomes a variable function of the pressure applied to the power nozzle. Under these circumstances, amplitude modulation of the cyclically varying pressure applied to the control nozzle by signals applied to the power nozzle and multiplication of signals applied to the power and control nozzles becomes possible with a conventional proportional amplifier.

It is an object of the present invention to provide a pure fluid modulator in which a cyclically varying pressure signal applied to a control nozzle of an analog amplifier may be amplitude modulated by an analog presure signal applied to the power nozzle or intermodulation may be effected between an amplitude modulated, cyclically varying signal applied to a control nozzle and a variable analog signal applied to the power nozzle.

It is another object of the present invention to provide a pure fluid amplifier system in which a cyclically varying pressure signal may be multiplied by an analog pressure signal to provide a cyclically varying amplitude of the output differential pressure which amplitude varies as a function of the product of the incremental changes in the two signals.

The above and still further objects, features and advantages of the present invention will become apparent upon consideration of the following detailed description of specific embodiments thereof, especially when taken in conjunction with the accompanying drawings, wherein:

The single figure of the accompanying drawing is a schematic diagram of the apparatus of the present invention.

Referring to the single figure of the accompanying drawing, there is illustrated a pure fluid amplifier 1 of the proportional or analog type having a power nozzle 2, control nozzles 3 and 4, and output passages 6 and 7. A carrier signal; that is, a periodically, i.e. cyclically varying pressure signal, is applied to the control nozzle 3. If no signal is applied to the power nozzle 2, substantially no signal appears in the output passages 6 and 7.

In accordance with the present invention, however, if fluid under pressure is applied to the power nozzle 2, then a push-pull output signal appears in the passages 6 and 7, the signal comprising the cyclic control signal amplitude modulated as a function of the pressure applied to the power nozzle 2. The instantaneous differential signal appearing between the passages 6 and 7 is expressed as follows in Equation 1:

$$d\Delta P_o = KdP_S \cdot dP_C \quad (1)$$

where K is the gain of the device, $d\Delta P_o$ is the change in differential pressure output, $dP_S$ is the change in supply pressure and $dP_C$ is the change in control pressure.

It is apparent from Equation 1 that, if the supply pressure is, for instance, doubled, the output differential pressure is doubled. Also, if the peak-to-peak amplitude of the control signal pressure is doubled, the differential output pressure is doubled. Further, if both signals are doubled, then the differential output pressure is quadrupled.

The apparatus as described above is a multiplier.

If now the signal $dP_s$ is the inverse of another signal, Equation 1 becomes Equation 2 as follows:

$$d\Delta P_o = K(dP_o)\left(\frac{1}{dP_f}\right) \quad (2)$$

and a divider circuit is now provided.

The inversion of the signal $\Delta P_f$ may be approximated by a second amplifier 11 having a power nozzle 12, control nozzles 13 and 14 and output passages 16 and 17. The control passage 14 may be connected to the source of power to the nozzle 12 so as to provide a suitable bias signal to the apparatus. More specifically, since the device is to be operated as an inverter, the nozzle 14 may be biased such that initially a specific portion of the power flow from the nozzle 12 is directed to an output passage 17. A control signal $P_f$ is applied to the control nozzle 13 so that, as the signal $P_f$ increases, the flow to the output passage 17 decreases. Thus, the change of signal in channel 17 is an approximate inverse function of the signal $P_f$. The passage 17 is connected to the power nozzle 2 of the amplifier 1 so that the signal $P_s$ applied thereto is an approximate inverse function of $\Delta P_f$. If desired, the amplifier 11 may have a unity gain so that $\Delta P_s$ is approximately equal to $1/\Delta P_f$. If the amplifier 11 has a gain of greater or less than 1, Equation 2 must be modified by the gain factor of the amplifier 11. The equation relating $P_f$ and $P_s$ in the amplifier 11 is: $\Delta P_f = K_a(1 - K_b P_s)$ which over small signal variations approximately equals $$K\frac{1}{P_f}$$

If it is wished to operate into an alternating or cyclic pressure system, the differential in pressure across passages 6 and 7 may be applied to a differential device, i.e. a conventional analog amplifier with opposed control nozzles. If it is desired to return to an analog system, the passages 6 and 7 may be connected to a full wave rectifier 18 followed by a filter 19, to provide an output signal in a passage 21, which has an amplitude change proportional to the product of $dP_s$ times $\Delta P_c$.

The rectifier filter arrangements 18 and 19 may be found in FIGURE 1 of co-pending patent application Ser. No. 293,108 of John R. Colston filed on July 5, 1963 for "Turbine Speed Control," now U.S. Patent No. 3,292,648, and assigned to the same assignee as the present invention.

It is seen that by the use of a single amplifier, an amplitude modulated apparatus may be provided, whereas by the addition of the amplifier 11, a pure fluid divider is provided, the rectifier 18 and filter 19 may be added to either types of circuit to convert from an alternating pressure system to an analog pressure system.

While we have described and illustrated specific embodiments of our invention, it will be clear that variation of the details of construction which are specifically illustrated and described may be resorted to without departing from the true spirit and scope of the invention as defined in the appended claims.

What we claim is:

1. A pure fluid modulator-multiplier comprising: a pure fluid analog amplifier including a power nozzle, at least two output passages and at least one control nozzle; a variable fluid pressure signal source; first means for applying said variable fluid pressure signal to said power nozzle; a cyclically varying fluid pressure signal source; and second means for applying said cyclically varying fluid pressure signal to said control nozzle.

2. The combination according to claim 1 wherein said cyclically varying fluid pressure signal source comprises a pure fluid oscillator.

3. A pure fluid modulator-multiplier comprising: a pure fluid analog amplifier including a power nozzle, at least two output passages and at least one control nozzle; a variable fluid pressure signal source; first means for applying said variable fluid pressure signal to said power nozzle; a cyclically varying fluid pressure signal source; and second means for applying said cyclically varying fluid pressure signal to said control nozzle; wherein said variable fluid pressure signal source comprises means for applying to said power nozzle a signal which is an inverse function of a first fluid signal.

4. The combination according to claim 1 further comprising means for rectifying and filtering the fluid flows in said output passages.

5. A pure fluid apparatus comprising: a pure fluid analog amplifier including a power nozzle, at least two output passages and at least one control nozzle; a variable fluid pressure signal source; first means for applying said variable fluid pressure signal to said power nozzle; a cyclically varying fluid pressure signal source; and second means for applying said cyclically varying fluid pressure signal to said control nozzle.

6. A pure fluid modulator-multiplier comprising: a pure fluid analog amplifier including a power nozzle, at least two output passages and at least one control nozzle; a variable fluid pressure signal source; means for applying said variable fluid pressure signal to said power nozzle and a pure fluid oscillator connected to said control nozzle.

7. A pure fluid modulator-multiplier comprising: a pure fluid analog amplifier including a power nozzle, at least two output passages and at least one control nozzle; a further fluid amplifier; means for connecting said further fluid amplifier to supply information signals to said power nozzle; and a pure fluid oscillator connected to said control nozzle.

8. A pure fluid modulator-multiplier comprising: a pure fluid analog amplifier including a power nozzle, at least two output passages and at least one control nozzle; a further pure fluid amplifier connected to supply information signals to said power nozzle; and means for applying a cyclically varying fluid pressure signal to said control nozzle.

9. A pure fluid device comprising:

a pure fluid amplifier having a power nozzle, at least two output passages, and at least one control nozzle;

a source of variable fluid pressure signals, a source of cyclically varying fluid pressure signals, means including said pure fluid amplifier for providing a differential fluid pressure signal across said output passages as a function of the multiplication product of said variable fluid pressure signal and said cyclically varying fluid pressure signal, said means further including: first means for applying said variable fluid pressure signal to said power nozzle; and second means for applying said cyclically varying fluid pressure signal to said control nozzle.

10. A pure fluid device comprising:

a pure fluid amplifier having a power nozzle, at least two output passages, and at least one control nozzle;

a source of variable fluid pressure signals, a source of cyclically varying fluid pressure signals;

means including said pure fluid amplifier for providing a differential fluid pressure signal across said output passages as a function of the multiplication product of said variable fluid pressure signal and said cyclically varying fluid pressure signal, said means further including: first means for applying said variable fluid pressure signal to said power nozzle; and second means for applying said cyclically varying fluid pressure signal to said control nozzle;

wherein said first means comprises a signal which is an inverse function of a first fluid pressure signal.

References Cited

UNITED STATES PATENTS

| | | | |
|---|---|---|---|
| 3,348,562 | 10/1967 | Ogren | 137—81.5 |
| 3,111,291 | 11/1963 | Horton | 137—81.5 |
| 3,117,593 | 1/1964 | Sowers | 137—81.5 |
| 3,191,611 | 6/1965 | Bauer | 137—81.5 |
| 3,208,464 | 9/1965 | Zilberfarb | 137—81.5 |
| 3,276,464 | 10/1966 | Metzger | 137—81.5 |
| 3,292,648 | 12/1966 | Colston | 137—81.5 |
| 3,324,730 | 6/1967 | Bowles | 137—81.5 |

M. CARY NELSON, *Primary Examiner.*

WILLIAM R. CLINE, *Assistant Examiner.*